US007164081B1

(12) United States Patent
Tollefson

(10) Patent No.: US 7,164,081 B1
(45) Date of Patent: Jan. 16, 2007

(54) TOOLBOX WITH RETRACTABLE CABLE SECUREMENT DEVICE

(75) Inventor: Dale Anton Tollefson, Brush Prairie, WA (US)

(73) Assignee: Peak Recreational Products, LLC, Vancouver, WA (US)

( * ) Notice: Subject to any disclaimer, the term of this patent is extended or adjusted under 35 U.S.C. 154(b) by 0 days.

(21) Appl. No.: 11/467,513

(22) Filed: Aug. 25, 2006

(51) Int. Cl.
*H02G 3/08* (2006.01)

(52) U.S. Cl. ............................ 174/50; 174/58; 174/59; 174/135; 439/652; 191/12.4; 248/906

(58) Field of Classification Search .................. 174/50, 174/58, 59, 17 R, 63, 135; 439/501, 535, 439/652, 502; 248/906; 191/12.4, 12.2 R
See application file for complete search history.

(56) References Cited

U.S. PATENT DOCUMENTS

| | | | | |
|---|---|---|---|---|
| 3,605,458 | A | | 9/1971 | Best |
| 3,640,423 | A | | 2/1972 | Parker et al. |
| 3,728,879 | A | | 4/1973 | Best |
| 3,879,721 | A | | 4/1975 | Yereance |
| 3,950,972 | A | | 4/1976 | Bleier et al. |
| 4,044,577 | A | | 8/1977 | Horlacher |
| 4,086,795 | A | | 5/1978 | Foster et al. |
| 4,098,099 | A | | 7/1978 | Smith |
| 4,350,257 | A | | 9/1982 | Groth et al. |
| 4,665,724 | A | | 5/1987 | Sakai |
| 4,693,098 | A | | 9/1987 | Davis et al. |
| 4,721,347 | A | | 1/1988 | Kristselis |
| 4,760,719 | A | | 8/1988 | Evans et al. |
| 4,845,967 | A | | 7/1989 | Evans et al. |
| 5,531,083 | A | | 7/1996 | Franck, III et al. |
| 5,572,821 | A | | 11/1996 | Coleman |
| 5,598,727 | A | | 2/1997 | White |
| 5,669,571 | A | * | 9/1997 | Graybill .................. 242/378.1 |
| 5,786,759 | A | | 7/1998 | Ling |
| 5,960,652 | A | | 10/1999 | Marmstad |
| 6,079,679 | A | | 6/2000 | Mitchell |
| 6,212,710 | B1 | | 4/2001 | Jones |
| D460,341 | S | | 7/2002 | Ling |
| 6,418,766 | B1 | | 7/2002 | Luebeck |
| 6,581,420 | B1 | | 6/2003 | Ling et al. |
| 6,588,638 | B1 | | 7/2003 | Luebeck et al. |
| 6,619,980 | B1 | * | 9/2003 | Hsiao ......................... 439/501 |
| 6,886,713 | B1 | | 5/2005 | Scherrer |
| 6,909,046 | B1 | * | 6/2005 | Laity et al. ................... 174/50 |

(Continued)

FOREIGN PATENT DOCUMENTS

| | | | |
|---|---|---|---|
| NL | 8300-423 | A | 3/1984 |

*Primary Examiner*—Dhiru R. Patel
(74) *Attorney, Agent, or Firm*—Fields IP, PS

(57) ABSTRACT

In one embodiment, a toolbox may includes a plurality of walls that define at least in part an interior from/into which tools may be retrieved or deposited. A cable housing may be secured to an interior wall of the toolbox, with a reel secured therein for rotational winding and unwinding of a cable. A cable retention knob on the distal end of the cable may be available external the cable housing for enabling withdrawal of the cable external the toolbox. Further, a power spring may be operatively configured to apply a rotational force to the reel to enable tensioned winding/unwinding of the cable about the reel. In a particular example, the walls for the toolbox form an external shape adapted for installation across the bed of a pickup truck.

22 Claims, 6 Drawing Sheets

U.S. PATENT DOCUMENTS 7,000,746 B1 * 2/2006 Mackin et al. ............. 191/12.4
7,108,544 B1 * 9/2006 Zoller ........................ 439/501
2006/0130541 A1 6/2006 Tollefson

* cited by examiner

TOOLBOX WITH RETRACTABLE CABLE SECUREMENT DEVICE

TECHNICAL FIELD

The present disclosure relates to toolboxes and, more particularly, to toolboxes formed with a retractable cable securement assembly. In some embodiments, the toolbox may be defined by a cabinet structure and/or structure operable for mounting across the bed of a pickup truck.

BACKGROUND

Toolboxes are generally known to be formed in a variety of configurations, which may provide internal compartments accessible by a user for retrieval, return and storage of tools. Some known embodiments for the toolbox may be mounted across a truck bed behind the cab of a pickup truck, from which tools may be frequently removed and returned by the user while working alongside the truck at a remote setting. Other embodiments for the toolbox may comprise a cabinet structure of a substantially fixed or rollaway configuration, from which tools may be removed and returned by the user while working in proximity of the toolbox, for example, within a garage or workshop.

In some cases, a user may have more cumbersome tools or equipment that may not be capable of ready stowage within the toolbox. The user may further find an occasional need for temporary leave from the job. Cables and locks might generally be known for assisting the user in security of the cumbersome tools and equipment. For example, a cable or chain of given length may be wound about/through the tools and equipment, or other personal property, and interlocked together in association with a large object to deter theft of the tools or equipment during the user's temporary departure.

In some circumstances, however, it may become difficult to find a large object to which the chain or cable may be interlocked, the cable may be lost, or it may be awkward to handle the chain or cable when wrapping it about the equipment together with the large object.

SUMMARY

In accordance with an embodiment of the present invention, a toolbox may comprise a plurality of walls that define at least in part an interior. A cable housing may be operably disposed within the interior for the toolbox. A reel may be secured for axial rotation within the cable housing. A cable may be attached to the reel and may comprise a length that may be removable wrapped about the reel for storage. A distal end of the cable may be attached to a cable retention knob accessible external the toolbox.

In a particular embodiment, the cable housing may be secured to at least one of the plurality of walls for positioning and enabling passage of the cable through an aperture defined in an exterior wall of the plurality. A spring may be configured to apply a rotational force to the reel for enabling tensioned winding or unwinding of the cable onto or from the reel. In a particular embodiment, the plurality of walls associated with defining the interior for the toolbox may form an external shape adapted for installation across the bed of a pickup truck.

In another embodiment, the plurality of walls may define at least in part a cabinet structure comprising multiple drawers configured for slidable operation within drawer slots of the cabinet toolbox. An external wall for a given drawer of the multiple drawers may define an aperture through which the cable is threaded.

In a further embodiment, a fastener may couple the cable housing to at least one interior wall of the cable housing. Resilient padding may be disposed between at least a portion of the cable housing and the at least one interior wall of the plurality.

BRIEF DESCRIPTION OF THE DRAWINGS

The subject matter of embodiments of the present invention may be understood by reference to the following detailed description and with reference to the accompanying drawings, in which.

DETAILED DESCRIPTION

Figure 1:
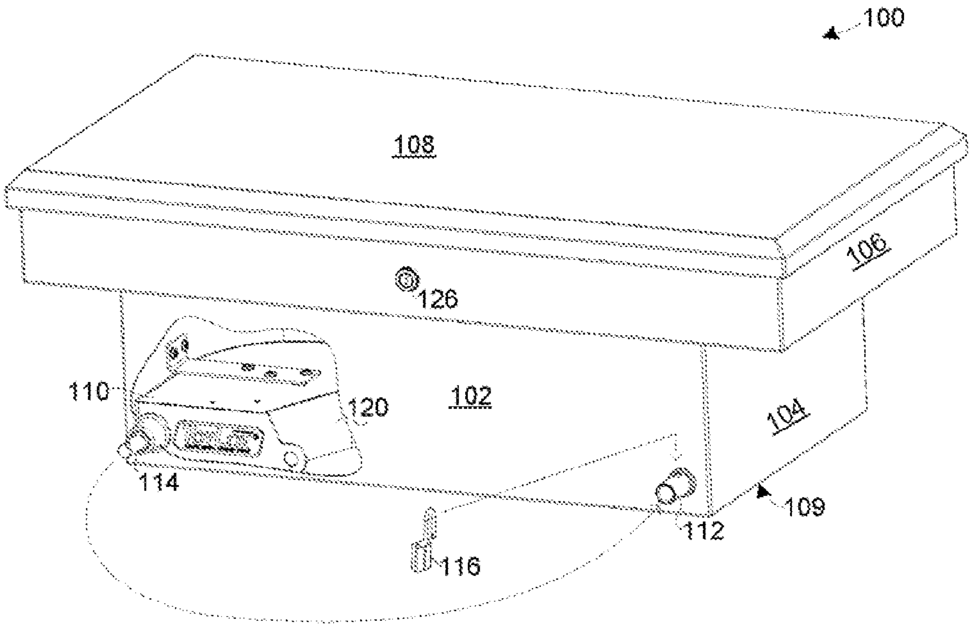
FIG. 1 is a simplified perspective view of a toolbox, consistent with an embodiment of the present invention, configured to assist installation across the bed of a pickup truck.

While the invention is amenable to various modifications and alternative forms, specifics of particular embodiments are presented by way of example in the drawings. It should be understood, however, that the intent is not necessarily to limit the invention to the particular embodiments described. On the contrary, the intent is to cover all modifications, equivalents, and alternatives falling within the spirit and scope of the invention as defined by the appended claims.

In the description that follows, readily established structures for the embodiments of the present invention may be disclosed in simplified form (e.g., simplified structures of cabinets, frames, drawers, housing, ratchet members, cable ends, brackets, grommets, etc.) to avoid obscuring an understanding of the embodiments with excess detail and where persons of ordinary skill in this art can readily understand their operative structure by way of the drawings and disclosure. Likewise, identical components may be given the same reference numerals, regardless of whether they are shown in different embodiments of the invention. Further, it may be understood that the illustrated depictions for particular embodiments may not necessarily be drawn to scale.

In accordance with an embodiment of the present invention, referencing FIG. 1, toolbox 100 may comprise a plurality of walls that define at least in part an interior that may be available for access by a user for storage, retrieval and return of tools. For example, the plurality of walls may include right and left sidewalls 104 which may be disposed across and opposite one another on opposite ends of the longitudinal box. Front and back sidewalls 102 of the toolbox may be disposed across the width of the toolbox along its longitudinal length. A width and a length for the interior compartment for the toolbox may be defined by these sidewalls. Floor 109 may be joined to the base of the sidewalls and extend therebetween. In a particular example, toolbox 100 may further comprise shoulders 106 configured as portions to sidewalls 104. The shoulders 106 may extend outwardly beyond the lower extents of the left and right sidewalls 104 and be operable to overlap sidewalls of a truck bed to a truck.

It may be understood, in certain embodiments, that toolbox 100 may be described more generally with floor 109 joined to sidewalls 102, 104 along peripheral edges thereof, effective to form at least in part an enclosure or compartment. In one embodiment, the walls may be constructed with sheet metal. In another embodiment, the walls may be constructed with plastic. Further, they may include known reinforcement ribs to improve structural integrity. Additionally, it may be understood that toolbox 100 may further comprise a lid 108 of known configuration. Hinges as known may serve as pivotal joints by which the lid may be rotatably secured to at least a portion of a sidewall, known key-locking provisions 126 may be integrated together with the lid for enabling keyed or otherwise locked securement of the lid over the toolbox.

Further referencing FIG. 1, the toolbox may further comprise a retractable cable securement sub-assembly 110 fixed to at least one of the sidewalls that define the interior for the toolbox. In a particular example, the sub-assembly 110 may comprise a housing 120 with a reel secured for axial rotation therein. A cable may be secured to the reel and a retention knob may be fixed to a distal end of the cable opposite the reel. The reel may be operable to enable retractable winding/unwinding of the cable about a given circumference of the reel.

The cable housing with the reel may be fixed to at least one of the interior walls for the interior of the toolbox. The cable housing may be positioned for placement of the distal end of the cable relative to an aperture in the front wall 102 of the toolbox operable to enable substantially free passage of the cable through the aperture during retraction or rewind of the cable from/within the cable housing. Further, a spring may be configured to apply a rotational force to the reel for enabling tensioned winding and unwinding of the cable onto/from the reel.

Figure 2:
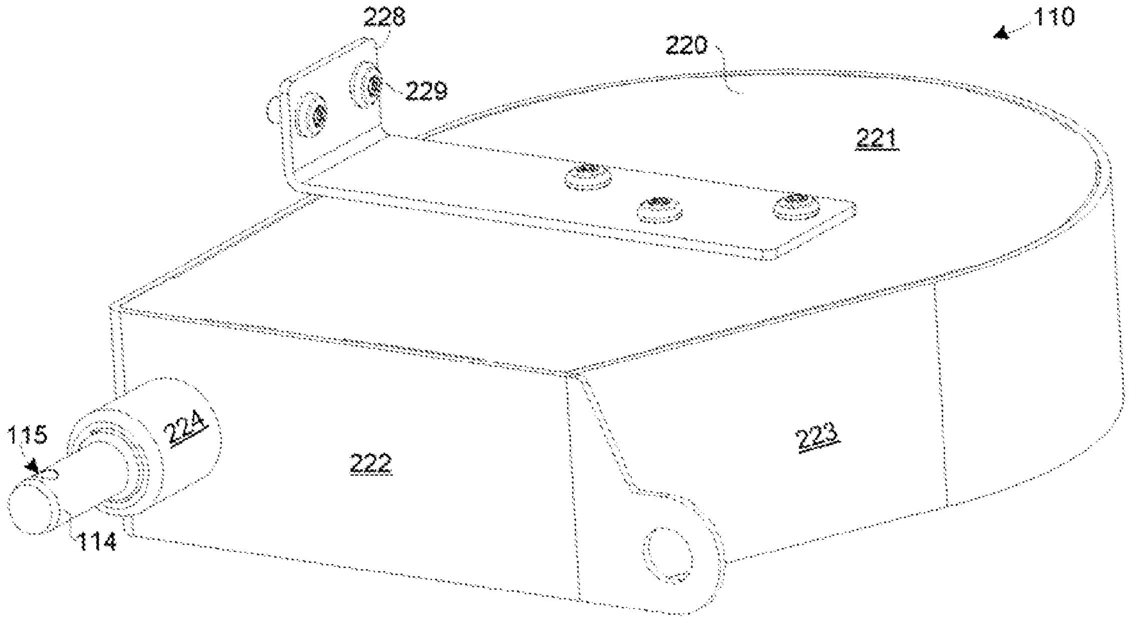
FIG. 2 is a simplified perspective view of a securement sub-assembly for the toolbox of FIG. 1, consistent with an embodiment of the present invention.
Figure 3:
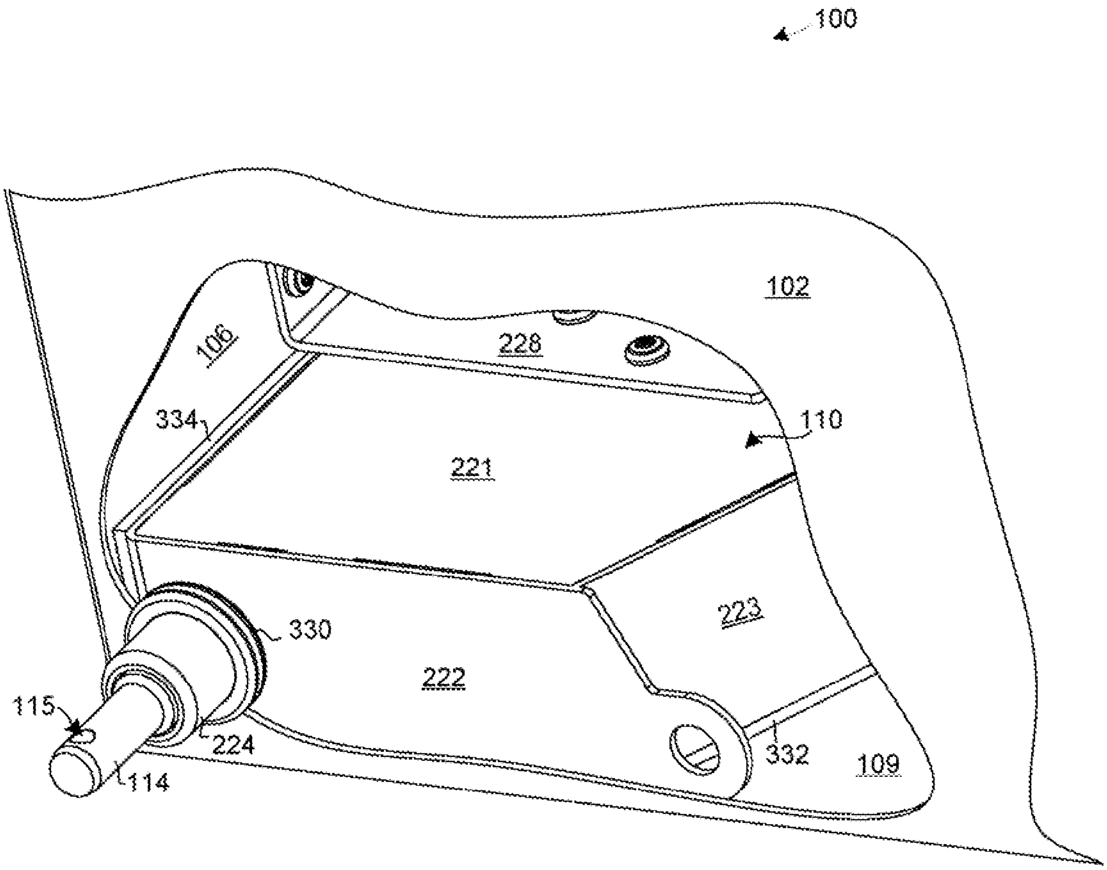
FIG. 3 is a simplified perspective and partial cut-away view of a portion of the toolbox, consistent with embodiments of the present invention, showing a bushing through which the cable is threaded and also resilient padding between the cable housing and the inner walls for the toolbox interior.
Figure 4:
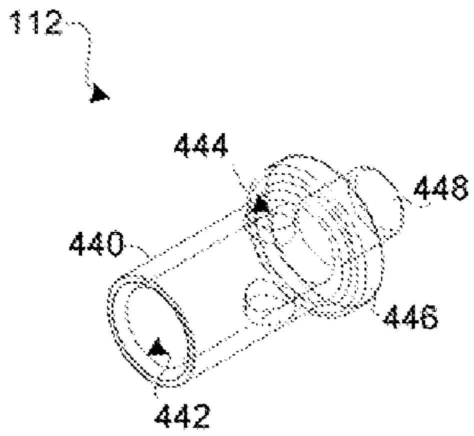
FIG. 4 is a simplified perspective view of a hollowed securement member for the toolbox of FIG. 1, in accordance with an embodiment of the present invention.
Figure 5:
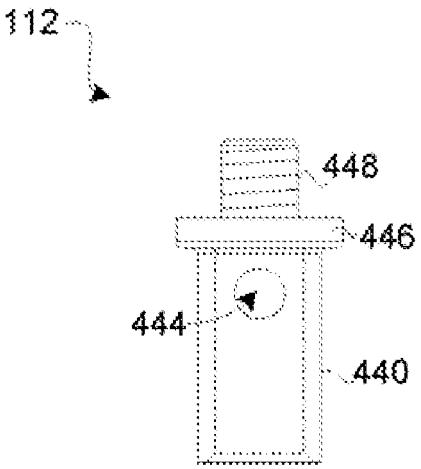
FIGS. 5 and 6 provide simplified top and side views for the securement member of FIG. 4.
Figure 6:
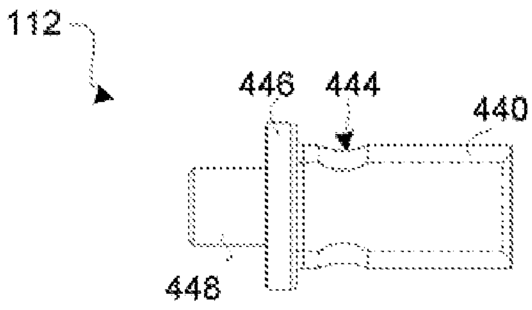

Further referencing FIG. 1 in combination with FIGS. 2 and 3, the toolbox may further comprise mounts for fixing the cable housing 220 of the securement sub-assembly 110 to at least one of the sidewalls 102, 104, 109 associated with defining the interior of the toolbox. For example, cable housing 110 may be secured to a left sidewall 104 of the toolbox by brackets 228 and fasteners 229. The bracket of one embodiment may physically secure a portion (top wall 221) of cable housing 220 relative to an interior (left) sidewall 106 for the toolbox compartment. In further embodiments, the fasteners for securing the cable housing may comprise metal or synthetically weld joints, calking materials and/or compressive pad/adhesives to physically interface the cable housing with the interior walls for the toolbox.

In a further embodiment, a bushing 224 may be found integrally with cable housing 220 to define a passage of given diameter and length through at least one of the aperture to a front wall 102 of the toolbox and a front wall 222 for cable housing 220. The retractable cable of the securement assembly 110 may be threaded through the passage that is defined by bushing 224.

In one embodiment, the cable may comprise a cross-sectional diameter that is sufficiently less than that of the passage to permit substantially free passage of the cable when it is presented with an angular alignment relative to the central axis of the passage of magnitude of less than about 5 degrees. Further, the length of the passage and the coefficient of friction between the surface of the cable relative to the interior surface of the bushing may be cooperative together per the limited clearance of the cable for enabling formation of a resistance force upon the cable that may be greater than a take-up or winding force deliverable thereto by the spring-loaded reel when a given length of the cable should be released external the toolbox during a rewind process.

In a further example, again referencing FIG. 3, the external surface of the bushing may be described as forming a neck disposed co-axially through the aperture formed or defined by front wall 102 for the toolbox. A grommet 330 may be disposed as known within the aperture operable to provide a compressive, resilient and/or sealed fit between the neck of the bushing and the annular edge of the wall that defines the aperture.

In a yet further embodiment, further referencing FIGS. 2–3, cable housing 220 defined at least in part by walls 221, 222 223 may be supported relative to the interior surfaces of, for example, floor 109 and sidewall 106 of the toolbox interior by way of resilient foam or padding 332. For example, foam padding 332 may be disposed (e.g., with adhesive) against floor 109 of the toolbox interior. A bracket fastening element 228 in combination with spot welds, rivets, screws 229 may be defined to fix a position of the cable housing 220 for a slight compressive bias against the resilient foam/padding 332. Additionally, foam padding 334 might also be disposed between a left sidewall of the cable housing for similar compressive biasing against the left sidewall 106 for the toolbox interior. Likewise, similar padding (not shown) may be provided between the front-wall 222 of the cable housing and the front-wall 102 for the toolbox interior. The form padding may be obtained as known operable to dampen vibrations, rattling or knocking of the cable housing relative to the interior sidewalls of the toolbox, e.g., as may occur during travel of the toolbox such as, within the bed of a pick-up truck in travel.

Moving forward with reference to FIGS. 1–3 and 7B, the cable retention knob at the distal end of the cable may comprise a butt end joined to the distal end of the cable and a cylindrical member 114 that is formed in integral relationship relative to the butt-end. The profile of the butt-end may be configured to seat in non-binding engagement with a cylindrical opening formed at the entry or exit of bushing 224 that is associated with the passage. Additionally, a hole 115 may be formed perpendicularly through at least a portion of the width of the cylindrical member.

Referencing FIGS. 1 and 4–6, in further embodiments, a knob securement member 112 may be fixed to an exterior wall of the toolbox. The knob securement member 112 may include inwardly facing cylindrical walls 442 that may define a cylindrical hollow of diameter capable of coaxially receiving the cylindrical member 114 of the cable retention knob. The knob securement member 112 may further be formed with a perpendicular opening 444, which may allow communication through and across a diameter of the cylindrical hollow. When aligned with the bored hole of the cable retention knob, the opening 444 of the securement member 112 may receive a shaft of a locking member such as a padlock (116 of FIG. 1) that may also be passed through the aligned openings of the securement knob for enabling an inter-locked securement.

In a particular embodiment, the securement member 113 may be welded to the external wall 102 of the toolbox. Alternatively, an aperture may be formed through the exterior wall 102, and a threaded neck 448 (FIGS. 4–6) of the securement member may be passed through the aperture for known fastening elements (nut and washer, snap-ring or other fixed capture member).

Above, a cylindrical shaft 114 has been characterized for the cable retention knob, and a cylindrical hollow described for the securement member 112. In other embodiments, alternative cross-sections may be realized for the cable retention knob 114 and securement member 112. For example, the cable retention knob may be formed with a square or rectangular cross-section and the securement member may be formed with a hollow of similar cross-section operable to receive and/or seat the shape of the knob.

Figure 7A:
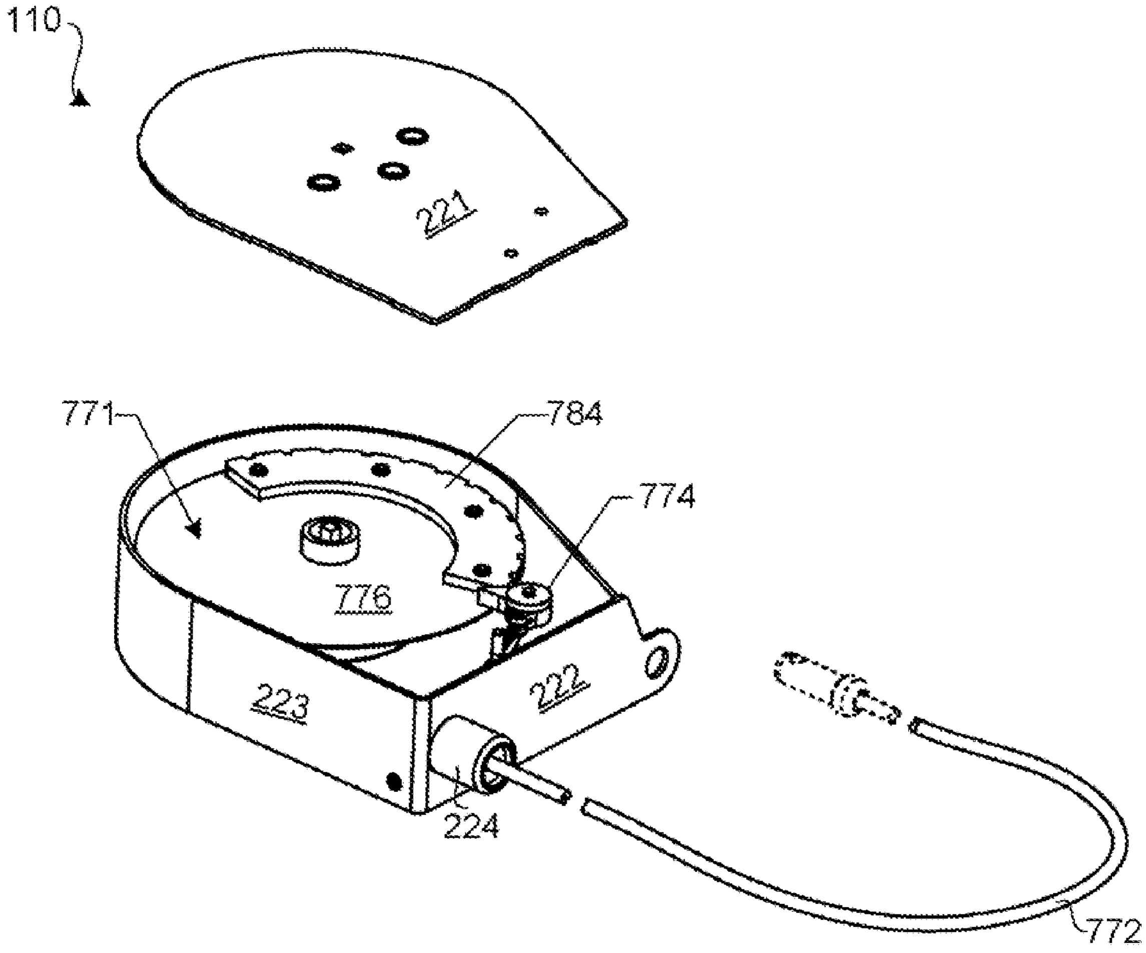
FIGS. 7A and 7B are simplified perspective and assembly views of the retractable cable securement sub-assembly for a toolbox, consistent with embodiments of the present invention, showing interrelationships of the cable reel and bushing with respect to the cable housing and also showing a cable retention knob.
Figure 7B:
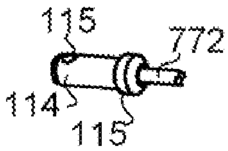
Figure 7C:
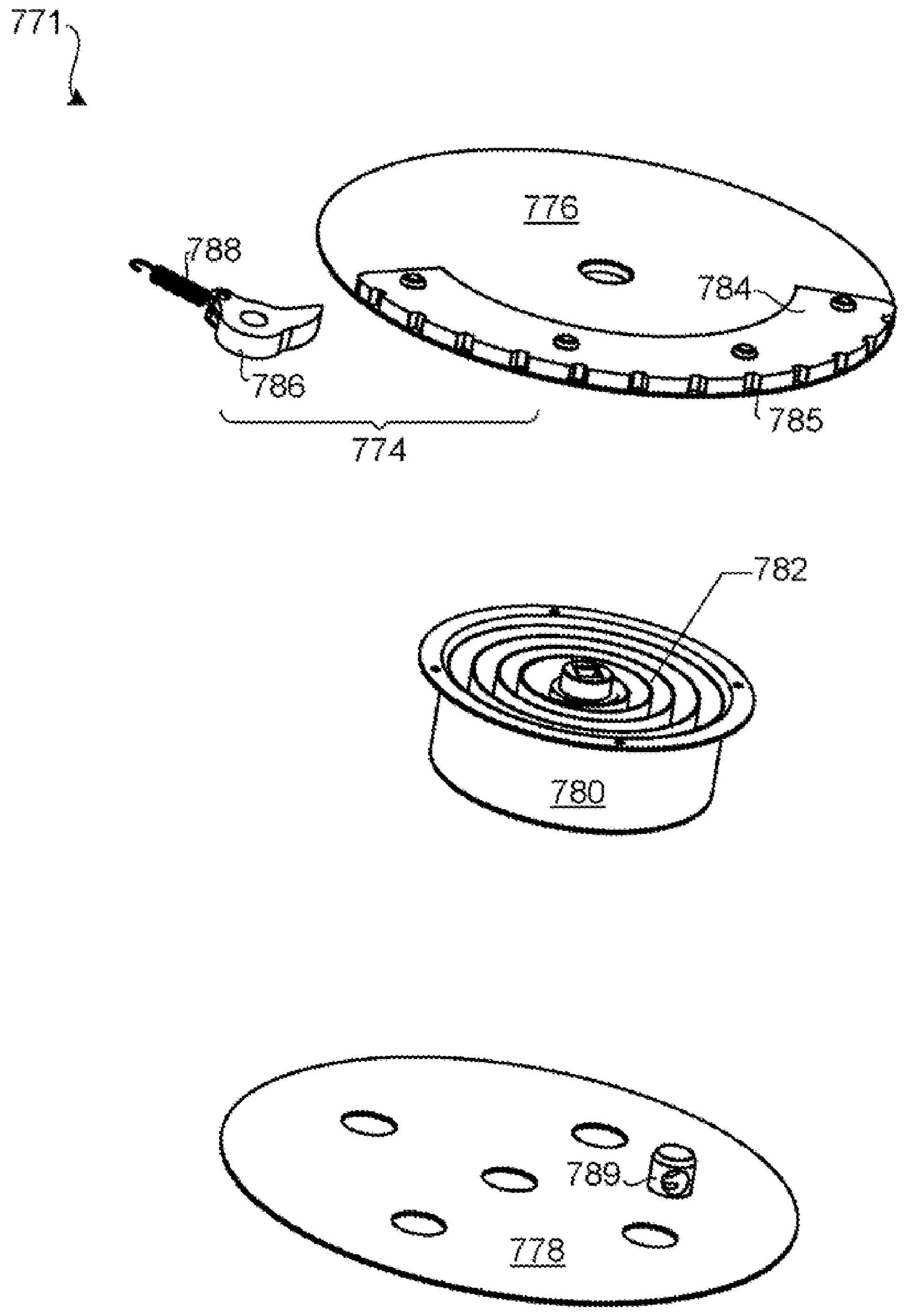
FIG. 7C is a simplified perspective and assembly view of the cable reel of FIG. 7A, which may be disposed within the cable housing to define at least part of a retractable cable securement sub-assembly, and also showing the reel, the core, the power spring and ratchet mechanism.

Moving forward with reference to FIGS. 7A–7C, in a particular embodiment, the retractable cable securement assembly 110 may comprise housing 220 defined by a plurality of walls 221, 222, 223. A reel 771 may be fixed for rotational operation within the housing. A cable 772 may have one end anchored to reel 771, while the distal end of the cable may be threaded through bushing 224 for accessibility external the housing. The passage defined by the bushing may comprise a diameter and length operable in combination with the cable to enable formation of a resistive force thereto when a given length of the cable is released external the housing. The resistive force may be sufficient for establishing a magnitude greater than a take-up force otherwise available by the reel and power spring.

In operation, therefore, bushing 224 may be described as a safety port. For example, if a given length of cable external the housing is released during a cable retrieval process, the cable may sag under its own weight for contacting an edge of the bushing 224, e.g., at the entry or exit of the passage. Therefore, the weight of the cable external the housing may be understood to rest substantially on the edge of the bushing defining the passage for imparting a resistive force upon the cable related to both the weight of the cable and the coefficient of friction between the bushing and the cable. It may also be understood that further resistive forces may be imparted to the cable dependent upon a cantilever action of the cable relative a rear edge of the passage as defined by the bushing.

Further information regarding bushing 224 and cable 772 may be found in U.S. patent application Ser. No. 11/345,864, filed Feb. 1, 2006, and published under U.S. patent publication No. US-2006-0144101 of Jul. 6, 2006, the disclosure of which is hereby incorporated by reference in its entirety.

Moving forward with reference to FIG. 7B, the butt end of the cable retention knob 114 may comprise a profile that flares outwardly from where it joins the cable. The flare-out may extend radially outward toward an outer circumference for the butt-end. The butt-end may thus form a shoulder of an angled (e.g., 45 degrees) flare-out operable to fit in non-binding engagement with a comparable countersunk or angled (e.g., 45 degrees) contoured surface for the opening of bushing 224. In other words, when cable 772 is fully retracted for storage within the cable housing, the flared shoulder defined by the butt-end of the cable retention knob may be held (under the influence of the tension presented to the cable by the spring-loaded reel) against the counter-sunk surface associated with the opening of bushing 224.

Further referencing FIGS. 7A and 7C, it may be understood that reel 771 may be secured within the cable housing for axially rotation therein. By rotation in one direction, the reel may be operable to retrieve the cable for storage. By rotation in an opposite direction, it may allow extraction or extension of the cable.

Further referencing FIG. 7C, upper plate flange 776 for the reel may comprise a ratchet mechanism 774 that may be operable to capture the reel and release tension on the cable at given lengths of cable 772 extraction. A ratchet lever 786 operable under bias by spring 788 may pivotally engage notches 785 of a ratchet gear 784 that is fixed relative to at least a portion of the circumference of the reel. As the cable is pulled outwardly, notches of the ratchet gear at given angular rotations of the reel may receive the catch-end of the ratchet lever 786. Accordingly, lever 786 may capture the reel. At larger increments of the reel, the ratchet lever may find a neutral zone across a second arc section of the reel as defined outside the arc-section of ratchet gear 784. In the neutral zone, the ratchet lever may find free clearance for enabling release of the reel, which in turn may enable spring-powered rewind of the cable.

In other words, the rotation of the reel may be reversed when it is rotationally positioned in the neutral zones; whereby, the ratchet gear may release the reel and a power spring 782 within the core 780 of the reel may act operably to drive retrieval of the cable from external the housing by winding it about the core of the reel. It may be understood that ratchet lever 786 and biasing spring 788 may be realized in other ratchet forms, while remaining collectively functional in cooperation with the reel for assisting incremental and retractable cable extension.

In a particular embodiment, the ratchet gear of ratchet 774 may be formed integrally with upper plate flange 776 of the reel. For example, the upper plate flange for the reel and the ratchet gear may be formed integrally as a single plastic component, e.g., by way of a plastic injection molding process. Alternatively, ratchet gear 784 may be formed as a separate component, which may then be, e.g., welded, stake welded, spot welded, compression welded, static welded, riveted, screwed or bolted for secured operable relationship with the upper plate flange 776 of the reel.

Reel assembly 771 may take various forms, e.g., in a particular embodiment with reference to FIG. 7C, it may comprise circular plates for the upper and lower flanges 776,778. The upper and lower flanges may be inter-coupled for sandwiching core 780 therebetween. A power spring or a clock spring 782 may be disposed within core 780 and configured as known to apply a rotational bias for delivering a torque to the core about a central axis of the reel. This may be operable to allow tensioned rewinding and/or tensioned unwinding of the cable onto/from the circumference of the core.

Figure 8:
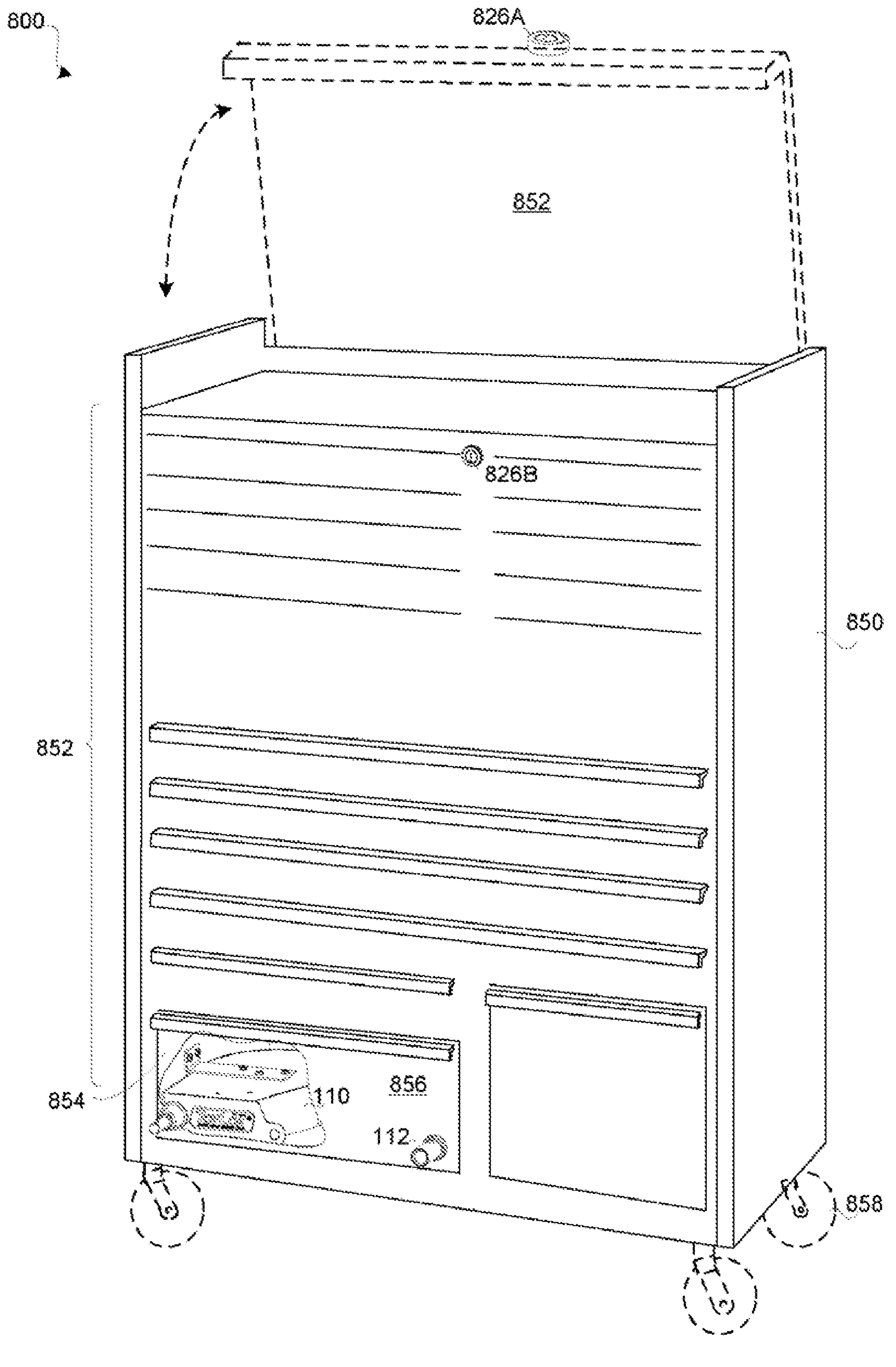
FIG. 8 is a simplified perspective view of a cabinet toolbox, consistent with embodiments of the present invention, showing a retractable cable securement sub-assembly within a drawer of the cabinet toolbox.

In accordance with a further embodiment of the present invention, referencing FIG. 8, toolbox 800 may be a cabinet style toolbox having a plurality of walls 850 that define a cabinet structure. In a particular embodiment, an upper lid 852 may be pivotally attached to a rear wall of the cabinet for enabling pivotal operation as a hinged lid for the cabinet. In an alternative embodiment, the upper wall may be of fixed configuration. Additionally, a plurality of drawers may be configured for slidable operation relative to slots formed in association with the frame structure of the cabinet. A given drawer 854 of the cabinet toolbox 850 may be defined at least in part by front wall 856, which in turn may define an aperture therethrough.

A cable housing 220 of a retractable cable securement sub-assembly 110 may be fixed to at least one inside wall of the given drawer 854 for placement within the interior. The mounting may be similar to embodiments described previously relative to FIGS. 1–3.

Likewise, a hollowed knob securement member 112 may be fixed (e.g., threaded, captured, bolted or welded) to a portion of front wall 856. The hollowed securement member 112 may comprise a structure similar to those described previously relative to FIGS. 4–6. In illustrated embodiments, the hollowed securement member 112 is fixed to the front wall of the same drawer as that through which the cable may be threaded.

In alternative embodiments, the hollowed securement member 112 may be omitted or fixed to another portion of the cabinet toolbox.

Finally, it may be understood that the cabinet toolbox of some embodiments may comprise castors or wheels 858 as known for enabling ready transport of the cabinet toolbox within a garage or workshop. In other embodiments, the cabinet toolbox may be absent castors or wheels.

The various embodiments as described above are provided by way of illustration only and should not be construed to limit the invention. Based on the above discussion and illustrations, those skilled in the art may readily recognize that various modifications and changes may be made to the present invention without strictly following the exemplary embodiments and applications as illustrated and described herein. Such modifications and changes do not depart from the true spirit and scope of the present invention as may be set forth in the following claims.

What is claimed is:

1. A toolbox comprising:

a plurality of walls defining at least in part an interior for accessible storage of tools, at least one of the walls of the plurality further defining an aperture;

a cable housing disposed within the interior;

a reel secured for axial rotation within the cable housing;

a cable having a first end secured to the reel and a second end opposite the first end;

a cable retention knob fixed to the second end of the cable;

a cable housing secured to at least one of the walls of the plurality to position the cable for operable passage through the aperture; and a spring configured to apply a rotational force to the reel to tension the cable during at least one of winding and unwinding of the cable onto or from the reel respectively.

2. The toolbox of claim 1, further comprising:

a bushing that defines a passage of given diameter and length, the length of the passage to extend through (i) the at least one of the walls of the plurality associated with defining the interior for the toolbox and (ii) the cable housing;

wherein the cable is threaded through the passage of the bushing.

3. The toolbox of claim 2, wherein the diameter of the passage defined by the bushing is sufficiently great to permit substantially free passage of the cable when the cable is presented to the passage with an angular alignment relative to its central axis of magnitude less than about 5 degrees; and at least one of the parameters of the group consisting of a clearance of the cable within the passage, the length of the passage and the coefficient of friction between the surface of the cable and that of the bushing walls defining the passage comprise magnitudes sufficient to be operable cooperatively for enabling formation of a resistive force on the cable greater than a take-up or winding force deliverable to the cable by the spring via a reel when a given length of the cable is released external the toolbox during a rewind process.

4. The toolbox of claim 2, in which the bushing is coupled with the cable housing;

an external surface of the bushing defines a neck disposed coaxially through the aperture defined by the at least one of the walls of the plurality; and the toolbox further comprises a grommet disposed for operative compressive fit between an annular edge of the aperture defined by the at least one of the walls of the plurality and the neck of the bushing.

5. The toolbox of claim 1, in which the plurality of walls defines at least in part an external shape predetermined to assist installation of the toolbox in the back of a pickup truck.

6. The toolbox of claim 1, in which the plurality of walls define at least in part a cabinet toolbox.

7. The toolbox of claim 6, in which the cabinet toolbox comprises a plurality of drawers; and the cable housing is fixed within a drawer of the plurality.

8. The toolbox of claim 1, further comprising a knob securement member fixed to the at least one of the walls of the plurality and configured to enable removable capture of the cable retention knob.

9. The toolbox of claim 8, in which the cable retention knob comprises:

a cylindrical member with a hole formed perpendicularly through a width thereof, and a butt-end in contiguous relationship with the cylindrical member, the butt-end joined to the second end of the cable with a profile operable to seat in non-binding relationship within the entry to the passage defined by the bushing;

the knob securement member comprises inwardly facing walls that define a cylindrical hallow of diameter capable of co-axially receiving the cylindrical member of the cable retention knob;

wherein opposing walls of the inwardly facing walls of the knob securement member across a diameter of the cylindrical hollow further define an opening that communicates in perpendicular relationship with or across the cylindrical hollow; and the perpendicular opening of the knob securement member is operable for relative alignment with the hole of the cylindrical member of the cable retention knob when it is seated coaxially therein, and further operable when they are in appropriate rotational alignments to enable releasable capture of the cable retention knob by insertion of a shaft of a locking member through the perpendicular opening of the knob securement member and the hole of the cable retention knob.

10. The toolbox of claim 1, further comprising a ratchet to releasably capture the reel at given incremental, angular rotations thereof for enabling release of tension of the cable at the associated incremental extractions of the cable from the cable housing.

11. The toolbox of claim 10, in which the ratchet comprises:

a ratchet-gear in rotational relationship to the reel, wherein the ratchet gear defines:

a first arc-section of given radius and coaxial relationship with respect to a circumference of the reel, and a plurality of notches at sequential angular increments through the first arc-section;

the ratchet gear further defines a neutral region of radius less than the given radius thereof for the first arc-section and notches, the neutral region extending across a second arc-section of the coaxial relationship relative to the reel, the angular extent for the second arc-section associated with the neutral region defined outside that for the first arc-section associated with the ratchet gear; and a ratchet lever biased to pivotally press against the outer radius of the circumference of the ratchet-gear and into the notches thereof during rotation of the reel in a given direction for extraction of the cable, the ratchet lever further operable when pressed into a given notch of the ratchet-gear to prevent rotation of the reel in a direction reverse to the given direction;

the radius of the neutral region of the ratchet-gear sufficiently less than the given radius to enable clearance of the ratchet lever for free pivot during rotation of the reel within the second arc-section and to enable a change in rotational direction of the reel.

12. The toolbox of claim 11, wherein the ratchet-gear is fixed to a flange plate of the reel and shares an axis of rotation in common with the reel.

13. The toolbox of claim 1, further comprising fastening means for operatively mounting the cable housing to the at least one of the walls of the plurality associated with defining the interior of the toolbox.

14. The toolbox of claim 13, in which the fastening means comprises at least one of a metal weld, a synthetic weld, a bracket, a screw, a rivet, calking and a compressive pad as physical interfacing for the cable housing relative to the at least one of the walls of the plurality.

15. A truck bed toolbox comprising:

a plurality of walls at least in part defining an interior for the toolbox and further defining an external shape operable to assist with installation of the toolbox with a bed of a truck;

an outwardly facing sidewall of the walls of the plurality defining an aperture;

a cable housing secured to at least one of the walls of the plurality for placement of the cable housing within the interior and proximate the aperture;

a bushing disposed on a wall of the cable housing, the bushing defining a passage therethrough for communicating from internal to external the cable housing and disposed in substantially coaxial relationship to the aperture defined by the outwardly facing sidewall;

a cable threaded through the passage defined by the bushing;

a cable retention knob fixed to a first end of the cable;

a reel disposed within the cable housing and secured to the second end of the cable; and a power spring adapted to apply a rotational force on the reel to enable tensioning of the cable during at least one of winding and unwinding of the cable about the reel.

16. The toolbox according to claim 15, wherein the reel comprises:

a core configured to enable winding of the cable about its circumference;

first and second plate flanges sandwiching the core;

a ratchet-gear disposed in integral relationship with at least one of the first and the second plate flanges; and a ratchet-lever or ratchet-paw operatively disposed in pivotal, spring-loaded relationship to an interior wall of the cable housing;

wherein the ratchet-lever and the ratchet-gear are collectively operable as a ratchet;

the ratchet-gear is formed with a plurality of notches across a first arc of an outer circumference of the reel, the ratchet-gear further defining a neutral region across a second arc-section relative to the outer circumference of the reel, the neutral region of the second arc-section as defined by and outside the extent of the ratchet-gear operable to enable free pivot of the ratchet-lever when the reel is rotationally positioned to encompass the ratchet-lever within the second arc-section associated with the neutral region, and the spring-loading of the ratchet-lever is operable to press a catch-end of the ratchet-lever against the outer circumference of the ratchet-gear over the first arc-section and into the notches during the rotation of the reel for cable extraction.

17. The toolbox according to claim 15, further comprising:

a fastener operably coupling the cable housing to the at least one of the walls of the plurality; and padding disposed between at least a portion of the cable housing and at least one of a floor wall and a sidewall of the walls of the plurality.

18. A cabinet toolbox comprising:

a cabinet defined at least in part by a frame;

a plurality of drawers operatively configured to slide within slots formed in integral relationship with the frame of the cabinet;

a front wall to a given drawer of the drawers of the plurality defining an aperture;

a cable housing disposed within the given drawer;

a reel operatively disposed for axial rotation within the cable housing;

a power spring to bias the reel with a rotational force;

a cable threaded through the aperture, a first end of the cable coupled to the reel; and a cable retention knob fixed to a second end of the cable opposite the first end.

19. The cabinet toolbox of claim 18, further comprising:

a bushing disposed in integral relationship with the housing to define a passage that extends from internal to external the cable housing, wherein the cable is threaded through the passage defined by the bushing; and a grommet disposed on an annular edge of the front wall that defines the aperture, the grommet to form a substantially resilient seal between the bushing and the annular edge.

20. The cabinet toolbox of claim 19, further comprising fastening means for operatively fixing the cable housing to at least one of the inwardly facing walls of the given drawer.

21. The cabinet toolbox of claim 20, in which the fastening means comprises at least one of a a metal weld, a synthetic weld, a bracket, a screw, a rivet, calking and a compressive pad to physically interface the cable housing to the at least one of the inwardly facing walls of the given drawer.

22. The toolbox of claim 18, further comprising a ratchet configured to be operable for releasable capture of the reel at given incremental angular rotations thereof for release of tension on the cable at associated incremental extractions of the cable from the cable housing.

* * * * *